United States Patent
Bodine et al.

(10) Patent No.: US 8,406,784 B2
(45) Date of Patent: Mar. 26, 2013

(54) MOBILE DEVICE DATA COLLECTION FOR USE IN MOBILE COMMUNICATION NETWORK IMPROVEMENTS

(75) Inventors: Tracy John Bodine, Hoffman Estates, IL (US); Adam Harold Wohld, Saint Charles, IL (US)

(73) Assignee: Cellco Partnership, Basking Ridge, NJ (US)

( * ) Notice: Subject to any disclaimer, the term of this patent is extended or adjusted under 35 U.S.C. 154(b) by 633 days.

(21) Appl. No.: 12/540,012

(22) Filed: Aug. 12, 2009

(65) Prior Publication Data

US 2011/0039571 A1    Feb. 17, 2011

(51) Int. Cl.
*H04W 24/00* (2009.01)
*H04W 4/00* (2009.01)
*H04B 17/00* (2006.01)

(52) U.S. Cl. .................. 455/456.1; 455/67.11; 455/466; 455/424; 455/456.3

(58) Field of Classification Search ............... 455/456.1, 455/466, 67.11
See application file for complete search history.

(56) References Cited

U.S. PATENT DOCUMENTS

| | | | |
|---|---|---|---|
| 6,052,584 A | | 4/2000 | Harvey et al. |
| 6,522,888 B1 * | | 2/2003 | Garceran et al. ........... 455/456.3 |
| 6,587,690 B1 * | | 7/2003 | Di Huo et al. ................ 455/446 |
| 6,778,823 B2 | | 8/2004 | Adam et al. |
| 7,024,161 B1 | | 4/2006 | LaMedica, Jr. |
| 7,218,929 B2 | | 5/2007 | Snyder et al. |
| 7,333,794 B2 | | 2/2008 | Zappala |
| 8,060,102 B2 * | | 11/2011 | Gazzola ......................... 455/446 |
| 8,301,149 B2 * | | 10/2012 | del Rio Romero et al. ... 455/443 |
| 2002/0111158 A1 * | | 8/2002 | Tee ................. 455/421 |
| 2002/0127993 A1 * | | 9/2002 | Zappala ......................... 455/404 |
| 2006/0246887 A1 | | 11/2006 | Barclay et al. |
| 2008/0076450 A1 | | 3/2008 | Nanda et al. |
| 2008/0188216 A1 | | 8/2008 | Kuo et al. |
| 2008/0274693 A1 * | | 11/2008 | Seo et al. ......................... 455/25 |
| 2008/0294384 A1 | | 11/2008 | Fok et al. |
| 2008/0305747 A1 | | 12/2008 | Aaron |
| 2009/0003219 A1 | | 1/2009 | Beacham et al. |
| 2010/0105377 A1 * | | 4/2010 | Iwamura et al. .............. 455/424 |

FOREIGN PATENT DOCUMENTS

EP    2117135 A1    11/2009

OTHER PUBLICATIONS

European Search Report from corresponding EP Application No. 10008380.7 dated Nov. 17, 2010.
"'Mark the Spot' iPhone app aims to find AT&T trouble areas," Apple Insider, Dec. 7, 2009, <http://www.appleinsider.com/artices/09/12/07/mark_the_spot_a...>.

* cited by examiner

*Primary Examiner* — Wayne Cai
*Assistant Examiner* — Timothy Pham (57) ABSTRACT

Capabilities of mobile stations are leveraged to measure operational characteristics of a mobile communications network and capture data regarding those measurements. Information related to where the measurements occurred is also captured. The captured measurement data and the location information are forward to a server for processing. The results of the processing are used to improve the performance of the mobile communications network.

35 Claims, 4 Drawing Sheets

MOBILE DEVICE DATA COLLECTION FOR USE IN MOBILE COMMUNICATION NETWORK IMPROVEMENTS

TECHNICAL FIELD

The present subject matter relates data collection in a mobile communications network. In particular, the subject matter relates to leveraging capabilities of mobile devices associated with a communication network to collect data that can be used to improve the quality of operation of the mobile network.

BACKGROUND

Various methods exist for collecting data about operational parameters and characteristics of a mobile communications network. For example, in a manual collection technique a number of trained employees or contractors visit various drive areas and collect data with measurement devices. This method is labor intensive, geographically limited in scope, and requires the use of expensive test equipment. For example, assume measurements are needed in dense urban areas and in sky scrapers. Using the this manual collection method makes it difficult, if not impossible, to collect data in many parts of these urban areas as they are off limits to data collectors and the data is also too time consuming to collect.

Another known technique for collecting operational parameters of a mobile communications network is known as autonomous collection. In this technique, specially designed devices that collect radio frequency (RF) mobile device measurements and event data are placed in vehicles that are driven around various collections areas. These specially designed devices report their measurements back to a central server. Creating the specialty devices is expensive. Also, the devices require special maintenance procedures. Also, the geographical scope of collection is limited by the number of autonomous devices installed in a region.

Yet another technique for collecting mobile communications network operational parameters is known as the per call measurement data method. In this technique, the wireless network communications network takes periodic measurements from the mobile phone and stores them in a central server with a latitude and longitude. This latitude and longitude is determined by using timing triangulation from the cellular towers of the mobile communications network.

In such a method, the location of where the measurements are taken can be very inaccurate due the limitations that result from using timing triangulation. Further, the location of the mobile station can only be determined when the mobile station is seen by a plurality of cellular towers.

Thus, a need exists for an improved technique of collecting data about operational characteristics of a mobile communications network and accurately recording where those measurements were taken. Further, the technique should not congest the mobile communications network with traffic from the collection of the data.

SUMMARY

The teachings herein alleviate one or more of the above noted problems with the known methods of data collection within a wireless communications network. Mobile stations operating on the mobile communications network collect data about operational characteristics of the mobile communications network and their interactions with the mobile communications networks. Leveraging the global position system (GPS) capabilities present in the mobile stations, the accuracy of the location of where the measurements were taken is ensured. The measurements can be taken at predetermined times, in response to various events, or at known intervals. The measurements as well as data identifying the locations where the measurements were taken are stored on the mobile stations. At various times, the measurement results and the associated location data are communicated back to an analysis server via the mobile communications network. For example, the measurements can be transmitted during known periods of low network traffic. In other cases, the measurements can be polled from the mobile devices at the request of another network element such as the analysis server.

In one instance, the disclosure is directed to a method of improving the performance of a mobile communications network. The method includes operating a plurality of mobile stations over time to take a plurality of measurements of one or more operational characteristics of the mobile communications network. The measurements of one or more operational characteristics of the mobile communications network and location information related to where the measurements were taken are stored in memories of the respective mobile stations. The method also includes communicating, from one or more of the mobile stations, the stored measurements and location information to a network element of the wireless communications network, processing the measurements and location information by the network element, and from the processing generating a recommendation for a change to one or more network elements to improve the performance of the mobile communications network.

In some instances, the stored measurements are communicated to a network element of the wireless communication network during a specified time. The stored measurements can be communicated via a short messaging service message to the network element of the wireless communications network. Also, the stored measurements can be communicated using data services of the network. For example, if the network supports EV-DO, 1×RTT, GSM, 2G Data, WiMax, GPRS and other types of data communications different protocols can be used to transfer the stored measurements.

In some examples, generating a recommendation for a change includes suggesting one or more improved parameters of a base station of the mobile communications network. The one or more improved parameters of the base station includes an antenna parameter selected from the group consisting of: antenna height; antenna tilt; azimuth swing; and power parameters. In one example, processing the measurements includes calculating the energy per chip for an antenna of the mobile communications network or energy propagation of an antenna.

In some instances, taking the measurements of the one or more operational characteristics includes measuring one or more operational characteristics of the mobile communication network selected from the group consisting of: an event code; satellite count; receive power; transmit power; channel; time; messaging; and location information. The measurements can be taken in response to a wireless communications network event, at periodic intervals, or in response to receiving a request from a network element.

In another aspect, the disclosure is directed to a mobile communications network that includes a traffic network configured to support communications and mobile stations in communication with the traffic network. Each respective one of a plurality of the mobile stations is configured to take measurements of one or more operational characteristics of the mobile communications network. Each such mobile station also is configured to store the measurements of one or more operational characteristics of the mobile communications network and location information related to where the measurements were taken, in a memory of the respective mobile station, and to communicate the stored measurements and location information to a network element of the wireless communications network.

The network includes a server in communication with the traffic network. The server receives the communicated measurements and location information from the plurality of mobile stations and processes the received measurements and location information to generate a recommendation for a change to one or more network elements to improve the performance of the mobile communications network.

In some instances, the plurality of mobile stations are configured to communicate the stored measurements and location information to a network element during a specified time. The communication can occur using a short messaging service message. Also, the stored measurements can be communicated using data services of the network. For example, if the network supports EV-DO, 1×RTT, GSM, 2G Data, WiMax, GPRS and other types of data communications different protocols can be used to transfer the stored measurements.

In some situations, the server processes the received measurements to generate a suggested change to one or more parameters of a base station of the mobile communications network. The parameters of the base station can include antenna parameters selected from the group consisting of: antenna height; antenna tilt; azimuth swing; and power parameters. The server can also processes the measurements to calculate the energy per chip for an antenna of the mobile communications network.

In some examples, the plurality of mobile stations measure one or more operational characteristics of the mobile communication network selected from the group consisting of: an event code; satellite count; receive power; transmit power; channel; time; messaging; and location information. The measurements can occur in response to a wireless communications network event, at a periodic interval, or in response to a request from a network element.

In another instance, the disclosure features an article of manufacture that includes a machine readable storage medium and executable program instructions embodied in the machine readable storage medium. When the instructions are executed by a programmable system of a mobile station, they cause the system to perform functions that measure one or more operational characteristics of the mobile communications network and determine the location of where each of the measurements was made. The functions also store the one or more measurements and the location of the measurements in a memory of the mobile station and communicate the stored measurements and location of where the measurements were made to a network element of the wireless communications network.

In another example, the disclosure features an article of manufacture that includes a machine readable storage medium and executable program instructions embodied in the machine readable storage medium. When the instructions are executed by a programmable system of a server coupled to a mobile communications network, they cause the system to perform functions that include processing mobile communication network measurements and associated location information captured by and communicated from a plurality of mobile stations of the mobile communications network and generate a recommendation for a change to one or more network elements to improve the performance of the mobile communications network.

In another aspect, the disclosure is directed to a method of troubleshooting a mobile station operating on a mobile communications network. The method includes receiving, by a network element of the mobile communications network, a plurality of measurements of one or more operational characteristics of the mobile communications network that were captured over time by the mobile station and location information related to where the measurements were taken in by the mobile station and processing those measurements by a network element. The method also includes identifying a problem related to the operation of the mobile station.

In some instances, the identified problem is with the mobile communications network. In other instances, the problem is associated with the mobile station. Of course, there can be problems with both the mobile communications network and the mobile station. In some instances, the method includes generating a recommendation for a change to a setting of at least one of the mobile station or a network element of the mobile communications network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to gathering network operational parameters of a mobile communications network using mobile stations operating on the mobile communications network. The mobile stations act as data collectors and store measurements of network parameters. Information as to the locations where the measurements were taken also is stored in the various mobile stations involved in the data collection. The stored measurement data and location information are retrieved from those mobile stations and analyzed.

In one aspect, the analysis results in a suggestion on how to improve one or more operational characteristics of the mobile communications network. For example, the analysis can result in a suggested change to one or more parameters of an antenna operating within the mobile communications network. In another example, network coverage maps are generated. Also, coverage maps for a specific mobile station can be generated. Further, the measurements can be used in real-time trouble shooting situations.

Figure 1:
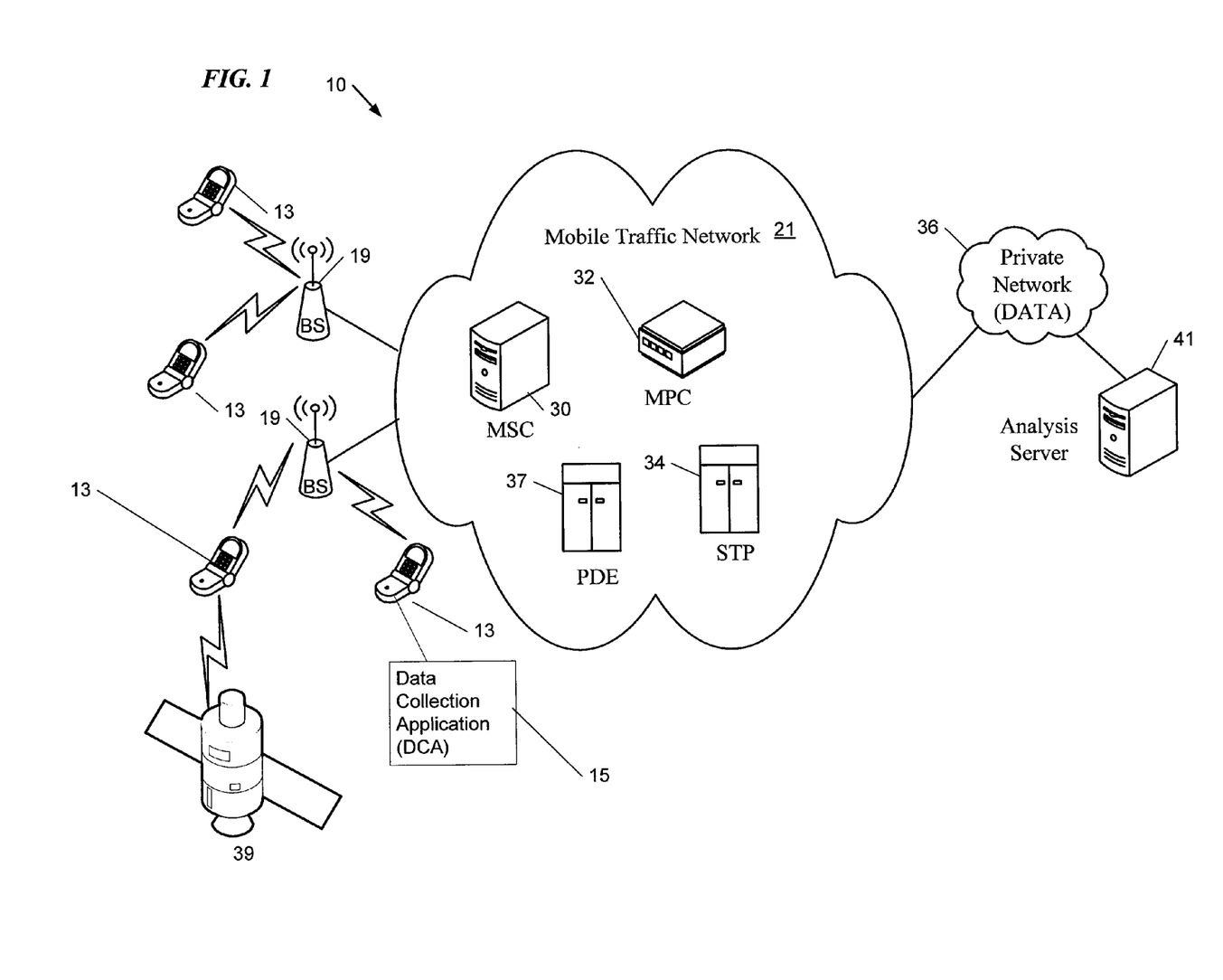
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations (not shown) outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications. A variety of different types of mobile stations supporting such communications are widely available.

For purposes of later discussion, several mobile stations 13 appear in the drawing, to represent examples of the mobile stations that may receive various services via the mobile communication network 10. For example, the mobile stations 13 can receive location based services (LBS) that leverage the use of an internal global position system (GPS) receiver. Today, mobile stations typically take the form of portable handsets, smart-phones or personal digital assistants, although they may be implemented in other form factors. At least one of the mobile stations 13, for example, intended for measuring operational characteristics of the network 10, can include a data collection application (DCA) 15, that can be downloaded to the mobile station 13 or added thereto in some other way. The DCA is actually provided in a mobile station 13 that otherwise provides normal mobile communications services of the network 10 to a user of the mobile station. The DCA 15 may be provided in any one mobile station, in a group (but not all) of the mobile stations, or in all users' mobile stations 13.

The data collection application 15 can be configured to capture and collect measurement of operational parameters and characteristics of the network 10. In addition, the locations of where the measurements are captured. Measurements collected by the device are either periodic, event driven, remotely polled or some combination thereof. In the case of periodic measurements, operational characteristics of the network 10 are collected by the DCA 15 at scheduled intervals. The MS 13 records its time-stamp, GPS coordinates, altitude, receive power, transmit power, messaging, and energy per chip (Ec) over receive power (Io) per antenna (PN) (Ec/Io per PN). This data is stored in memory of the MS 13.

The DCA 15 can also capture data in response to specific events. For example when a catastrophic event occurs like a dropped call or failed call attempt occurs, the DCA 15 records the time-stamp, GPS coordinates, altitude, receive power, transmit power, messaging, and Ec/Io per PN. The measured operational characteristics and associated location information are stored in memory of the MS 13.

In another example, the MS 13 can be polled remotely by sending it a SMS message, or similar message, to activate the DCA 15. Also, data services can be used such as those provided in EV-DO, 1×RTT, GSM, 2G Data, WiMaxx, GPRS and other types of communications networks. Again, the same types of parameters can be measured and stored with location information in the memory of the MS 13. The measured data can include all, some or various combinations of the following: an event code; a time stamp; the latitude; the longitude; the altitude, the satellite count; the receive power; the transmit power; messaging; channel identification; the first best PN; the first best PN Ec/Io; the second best PN; and the second best PN Ec/Io. The receive power and the Ec/Io measurements can be used later to calculate Ec per PN. The event code can be defined as an event such as a lost call, ineffective attempt, or periodic measurement.

The DCA 15 then stores the data for the measurements and the location information on the MS 13. The measurements and location information are processed by a network server and can be used in many different ways. For example, the measurements from a number of mobile stations can be used to generate a coverage map of a certain geographic region based on the associated location information. Also, coverage maps for an individual mobile station 13 can be generated. Also, the measurement data can be used in trouble shooting (both real-time and non-real-time) situations such as when the user of the mobile station 13 experiences a high number of dropped calls or poor call quality. Further, the measurements can be used to generate recommendations on how to improve the performance of the network 10.

The DCA 15 can be configured to execute on many different types of mobile stations 13. That is, the DCA 15 programming can be written to execute on a binary runtime environment for mobile (BREW-based) mobile station, a Windows Mobile based mobile station, anroid, I-Phone, Jave Mobile, or RIM based mobile station.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, when the mobile stations are within range. Each base station typically includes a BTS coupled to several antennae mounted on a radio tower within a coverage area often referred to as a "cell." The BTS is the part of the radio network that sends and receives RF signals to/from the mobile stations 13 that the base station 19 currently serves. In some instances, recommendations to change various components of the BS 19 (e.g., changes to one or more antenna parameters such as tilt and azimuth position) are made by processing the operational characteristics captured by the DCA 15 executing on the MS 13 and the associated measurement location information.

The radio access networks also include a traffic network represented generally by the cloud at 21, which carries the user communications for the mobile stations 13 between the base stations 19 and other elements with or through which the mobile stations communicate. In some examples, the mobile traffic network 21 includes network elements that support LBS services such as mobile switching centers (MSCs) 30, signal transfer points (STP) 34, mobile positioning center (MPC) 32, and a position determining entity (PDE) 37. The network can also include other elements, which are not shown, that support functionality other than location based services. Examples include, but are not limited to, message centers (MCs), home location registries (HLRs), and other network elements such as wireless internet gateways (WIGs), and visitor location registers (VLRs) (not shown).

Other individual elements such as switches and/or routers forming the traffic network 21 are omitted here for simplicity. Various combinations of the network elements cooperate to provide the various messaging service message forwarding capabilities discussed herein. It is understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile station and the other elements of the network 10. In addition, the MSC 30 is responsible for handling voice calls and messaging service message request as well as other services (such as conference calls, FAX and circuit switched data, messaging service communications, Internet access, etc.). The MSC 30 sets up and releases the end-to-end connection or session, and handles mobility and hand-over requirements during the call. The MSC 30 is sometimes referred to as a "switch". The MSC 30 manages the cell sites, the voice trunks, voicemail, and SS7 links. The DCA 15 may capture operational parameters of the network during events that occur at the MSC 30. For example, the DCA can capture data related to received power at the antenna of the mobile station 13 at times associated with pre-hand-over and post-hand-over along with the location where the handover occurred.

The PDE 37 is a network element that manages the position or geographic location determination of each mobile station 13. The exemplary network 10 utilizes an assisted GPS approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13. The location information may be provided to another entity, such as an emergency service point in a 911 scenario, or to the mobile station for mapping services and the like. In the context of the network parameter collection, the location information is provided to the mobile station for storage to mark the location where each of the measurements taken by the DCA 15 occurs. Measurements and location information are forwarded from storage in the mobile station to a server or other network element for processing. Using this location information along with the measurements, coverage maps, network element parameter changes, and other suggestions related to improving the quality of operation of the network 10 can be generated.

The PDE system 37 is essentially a general purpose programmable device with an interface for data communication via the network 10 running server software and running programming for implementation of the PDE functions, such as device authentication, data cache and processing queue management. The PDE 37 stores (e.g. in cache memory) or has access to a complete and up to date set of the satellite data for the constellation of GPS satellites 39 needed to allow computation of position based on pseudorange measurements of satellite signals by mobile stations 13. The data may include that associated with the entire constellation but will at least include the data for the satellites expected to be broadcasting into the geographic region serviced by the network 10.

When a mobile station 13 attempts a GPS position fix, the mobile station 13 provides information allowing the PDE 37 to perform a pre-fix. Typically, the mobile station 13 will provide data identifying the base station 19 through which it is receiving service (and possibly the serving sector). In some implementations, the PDE 37 may receive data regarding several base stations/sectors and signal strengths thereof, for trilateration. The PDE 37 uses information about base station location(s) to process the data received from the mobile station so as to determine a region (e.g. area of the cell or sector, or a general area triangulated based on signals from several base stations) that the mobile station 13 is likely located within. The PDE 37 then uses the pre-fix location to parse the satellite data down, to assistance data that the mobile station 13 at the particular location needs in order to take GPS readings. The PDE 37 sends the parsed satellite data to the mobile station 13, for use in taking measurements of signals from appropriate satellites 39. The GPS assistance data may contain selected satellite almanac, satellite visibility, Doppler and clock correction information.

The mobile station 13 will, in turn, use this information (also known as acquisition assistance records) to take multiple satellite pseudorange measurements. Depending on the device/network configuration, the mobile station 13 or the PDE 37 can then calculate a final fix using these pseudorange measurements. The final fix computation provides latitude and longitude (and possibly altitude) coordinates for the current location of the mobile station 13. If the mobile station 13 has full GPS computation capability, the station 13 would know its current latitude and longitude and may communicate that data to the PDE 37 through the network 10. For the network parameter measurement and collection functions, the DCA 15 would cause the mobile station 13 to store the latitude and longitude (and possibly altitude) coordinates for the current location of the mobile station 13 in memory within the station. In many cases, however, the mobile station 13 has only measurement capability, and the station forwards the measurement data to the PDE 37 to determine the final fix. In either case, the GPS processing leads to a situation in which the PDE 37 knows the latitude and longitude of the mobile station 13. If necessary, the PDE 37 can provide coordinates to the mobile station 13 or to another element that needs or has requested the location of the particular mobile station 13. Hence, if the mobile station does not determine the coordinates of the final fix for the network parameter measurement and collection functions, PDE sends the latitude and longitude (and possibly altitude) coordinates for the current location of the mobile station 13 back through the network to the mobile station, and the DCA 15 causes the mobile station 13 to store that location information in memory within the station.

In either case, for the network parameter measurement and collection functions, the location information (e.g., latitude, longitude, and sometimes altitude) is used to mark where the DCA 15 captures the operational parameters of the network 10. Using the above described location determination techniques can provide greater accuracy when compared to the triangulation methods previously used. This increased accuracy facilitates the creation of coverage maps and the like by providing certainty as to where the measurements occurred.

In addition, the traffic network portion 21 of the mobile communications network 10 connects to a private data network 36. The private data network 36 connects to the traffic network portion 21 via a gateway (not shown). The gateway can provide protocol conversions between the protocols used by the traffic network 21 and the protocols used by the private data network 36.

In communication with the private data network can be various auxiliary services servers that provide additional services to the users of the network 10 and/or to operations support personnel of the service provider or carrier that operates the network 10. For example, one or more analysis servers 41 are provided to process the captured operational characteristic measurements and associated measurement location information.

Analysis server 41 receives the measurements and location information from the mobile stations 13 via the network 10. The measurements can be delivered from the mobile stations at regular intervals (e.g., once daily at a time of low network traffic, hourly, or the like). In addition, the analysis server 41 can request (e.g., poll) the information from the mobile stations 13. The measurements can be transmitted in various ways form the MS 13 to the network 10. Examples include but are not limited to SMS messages, 1× CDMA Data, EV-DO, or LTE packet based transmissions.

The analysis server 41 stores the received measurement data and location information by MS 13 using an identifier such as a MIN or electronic serial number (ESN) of the respective mobile station. The analysis server 41 operates on the received measurements and location information together with information that is known about the network 10 itself (e.g. base station locations, existing power settings, etc.). Many different results can result from the different forms of processing of the measurements collected via the mobile stations 13. In one situation, a coverage map of a specific geographic region is compiled from the measurements. That is, the analysis server 41 processes measurements meeting certain location criteria. These maps can be used to modify parameters of antenna and other network elements. In one example, if a number of mobiles stations 13 are present at a sporting event on a certain day a plurality of them can be used to capture operational characteristics of the network 10 within the stadium hosting the event. These measurements can be processed and used to determine and suggest whether changes in one or more of the network elements may improve the coverage or performance of the network within the stadium.

In another example, the measurements are stored in a server and analyzed by engineers for further information. For example, Ec/Io and receive power can be mathematically manipulated to find out Ec. The data can be analyzed and used to tune the wireless network for greater performance.

Also, after a large number of measurements are gathered, they can be mapped and analyzed in many ways. For example, over a months time frame the mobile stations 13 gather enough measurements to provide an accurate and dense coverage map of a city where other methods of data collection are impossible. The data can show where further wireless optimization efforts are needed and also help determine what coverage is like in sky scrapers when the GPS information contains altitude.

Also, in another example when a customer may be having problems with their MS 13, the customer service agent can poll the mobile station 13 in real-time to see what kind of radio frequency environment that MS 13 is experiencing. From that information it could be determined if there is a customer device or network issue.

Figure 2:
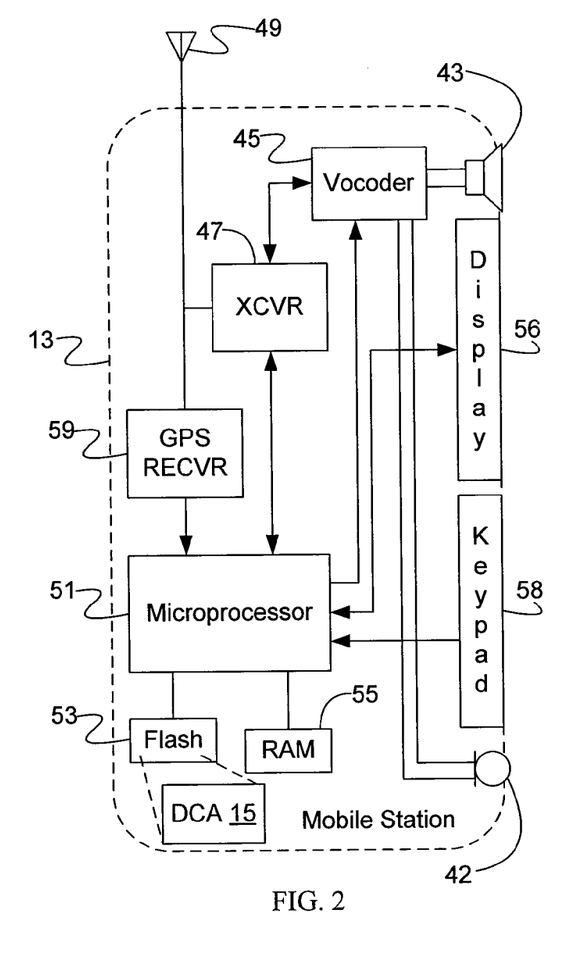
FIG. 2 is a simplified functional block diagram of a mobile station.

With reference to FIG. 2 a block diagram illustrating a GPS enabled mobile station 13 is shown and described. Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass embodiments of the station 13 utilizing any digital transceivers that conform to current or future developed digital wireless communication standards. For example, the transceiver 47 could be a TDMA or GSM unit designed for cellular or PCS operation. In the present embodiments, the digital transceiver 47 is a CDMA transceiver compatible with operation via an IS-95 network or a 1× network, to provide both voice and packet data communications. Also, the mobile station 13 may utilize either or both of 3GPP2 (1×RTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related acquisition assistance, position determination and related location based services. The transceiver 47 connects through RF send and receive amplifiers (not separately shown) to an antenna 49. In the example, the transceiver 47 is configured for RF communication in accord with a digital wireless protocol. The station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), the measurements captured by the DCA 15, etc. In a present implementation, the flash type program memory 55 stores an operating system, device driver software, call processing software and vocoder control software; and the memory may store any of a wide variety of other applications, such as client browser software and short message service software.

Of note for purposes of this discussion, the stored program software will also include a data capture application (DCA) 15. The DCA 15 provides functionality to capture operational characteristics of the mobile network 10. For example, the DCA 15 can capture and in some cases determine one or more of the following: an event code; a satellite count; receive power; transmit power; messaging; channel information; and in cooperation with the GPS receiver 59 location information related to where the measurements were made.

In one instance, the DCA 15 is downloaded from one of the elements to the mobile station 13 and stored therein.

Another approach includes downloading the programming over the air, from a third party server (not shown), from a OTAF provisioning system (not shown) or the like, the DCA 15 can also be loaded on the mobile station 13 by connecting the mobile station 13 to a personal computer (PC) and transferring the DCA 15 from the PC to the mobile station 13 using known techniques.

The memories 53, 55 also store various data, such as telephone numbers and server addresses and data input by the user. For example, the memory 53 and/or the memory 55 will at various times store coordinates obtained from the GPS processing. In addition, the memories 53, 55 will store the measurements of the operational characteristics of the network 10 captured by the DCA 15. For example, the memory can store the receive power from a specific antenna at a specific location.

As shown, the digital telephone handset 13 includes a display 56 for displaying messages, menus or the like, call related information dialed by the user, calling party numbers. If the mobile station runs location based service applications, the display 56 may provide other information regarding the determined location and/or surrounding areas, e.g. LAT/LON data, map displays and possibly displays of information about items of interest in and around the determined location. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections. Of course other user interface elements may be used, such as a stylus and touch sensitive display screen, as in a PDA or mobile smartphone.

For position determination and associated location based services, the mobile station 13 also includes a GPS receiver 59. Under control of the microprocessor 51, the GPS receiver 59 receives and processes signals from one or more satellites of the constellation of GPS satellites 39. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the station's latitude and longitude. However, because of size/space/cost constraints on the design of the mobile stations 13, the GPS receiver 59 in the mobile station 13 often will have only reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases will be back to the mobile station 13 for further processing. The final location determination is used by the DCA 15 to mark the location where the DCA 15 captured data related to the operational characteristics of the network 10.

Figure 3:
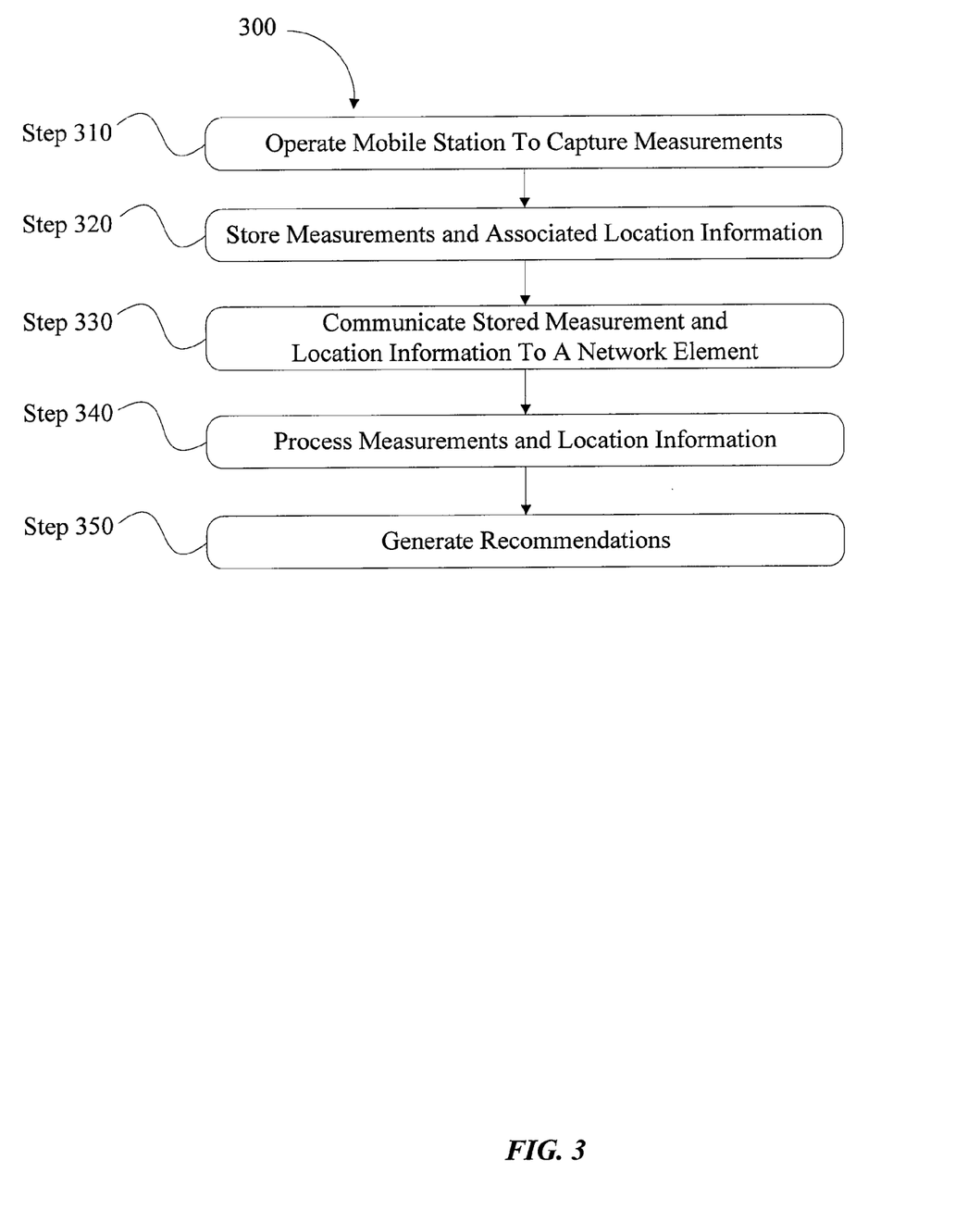
FIG. 3 is a flow chart depicting an exemplary method of improving the performance of a mobile communications network.

With reference to FIG. 3 an exemplary method 300 of improving the performance of the mobile communications network 10 is shown and described. In the shown example, the method 300 includes operating (step 310) a mobile station 13 to capture measurements of one or more operational characteristics of the network 10. The method 300 also includes storing (step 320) the measurements 13 and location (e.g., latitude, longitude, and altitude) information that described where the measurements were captured. The mobile station 13 communicates (step 330) the stored measurements and location information to a network element such as the analysis server 41.

In response, the analysis server 41 processes (step 340) the received measurements and associated location information and generates (step 350) one or more recommendations on how to improve one or more of the operational characteristics of the network 10.

As mentioned before, a typical network 10 provides services to a plurality of mobile stations 13. During operation (step 310) of the mobile stations 13, one or more of the mobile stations 13 executes the DCA 15 and captures measurements of operational characteristics of network 10. For example, each mobile station 13 records one or more of an event code, satellite count, receive power, transmit power, channel, and location information. These measurements can be made on a scheduled basis, in response to events such as a dropped call or failed call, or at the request of one the network elements. The location information can include the latitude, the longitude, and if possible the altitude of where each of the measurements was made. In some situations, groups of mobile stations 13 are selected to capture the operational characteristics information. For example, a group of mobile stations 13 communicating with a specific antenna (identified by PN code) can be requested to capture the network operational characteristics and location information. The captured measurements are stored (step 320) in one of the memories 53, 55 of the mobile station 13. Over time, the number of stored measurements increases.

The stored measurements are communicated (step 330) via the network 10 to another element of the network 10. For example, the stored measurements can be sent via short messaging service (SMS) message from the mobile station(s) to the analysis server 41. When the stored measurements are communicated is configurable. For example, the measurements can be communicated during known periods of low network traffic. Also, the measurements can be communicated prior to completing the power down of the mobile station or initially upon each new registering of the mobile station with the home network. Of course other mobile station events or network events can trigger communication of the stored measurements. Also, communication of the measurements can be triggered by a request from one of the network elements (e.g., the analysis server 41). Of course, mechanisms and protocols other than SMS can be used to convey the measurement data and location information, depending the communication protocols supported by the network 10 and the mobile stations 13. For example, in the case of 3G type networks the communication can occur using IP protocols.

Processing (step 340) of the measurements can occur at the analysis server 41. In some instances, processing includes sorting the received measurements by one or more parameters such as a time stamp, ESN, MIN, or location information. The processing can also include executing various algorithms on the received measurements. For example, the analysis server 41 can calculate the energy per chip (Ec) for an identified antenna of the network 10, such as a specific serving sector antenna of a selected one of the base stations 19. The energy per chip (Ec) provides a measure of the signal strength propagated from the antenna. The energy per chip can be derived from the receive power (Io) (which is also sometime referred to as the interference level) and Ec/Io per PN where PN is the pseudo random number of a CDMA signal used to distinguish among antennas of the network 10. To calculate Ec the Io is added to the Ec/Io (e.g., if Lo is −77 dBm, and Ec/Lo is −5 dBm, then Ec is −82 dBm).

The analysis server 41 can generate (step 350) one or more recommendations to improve the performance of one or more aspects of the mobile communications network 10. In one instance, the analysis server 41 can recommend a change to a parameter of one of the base stations 13. For example, the analysis server 41 can determine that modifications to one or more of antennas of the network can improve the performance of the network. Changes to the antenna parameters can include, but are not limited to, height changes, tilts, azimuth swings, power changes, and antenna replacements.

Also, the processed measurement can be used to generate various types of coverage maps (e.g., regional maps, maps for individuals mobile stations, etc.). Leveraging the GPS receiver 59 in the mobile stations is beneficial in a dense urban environment. This is because in some instances, the mobile stations can store altitude information that can be used to help generate a 3D model. These models can help network engineers visualize the network 10 and make antenna changes.

In another situation, the processed measurements can be used to provide real-time trouble shooting with respect to a particular mobile station 13. For example, if the mobile station 13 experiences a number of dropped calls in a specific location, customer service representative can poll measurements from the mobile station 13 during its operation to witness the changes in the RF environment experienced by the mobile station 13. Data can also be obtained at times of actual dropped calls, from that station 13. From the collected information, it could be determined if is the dropped call problem is a mobile station 13 issue or a network 10 issue.

Figures 4, 5:
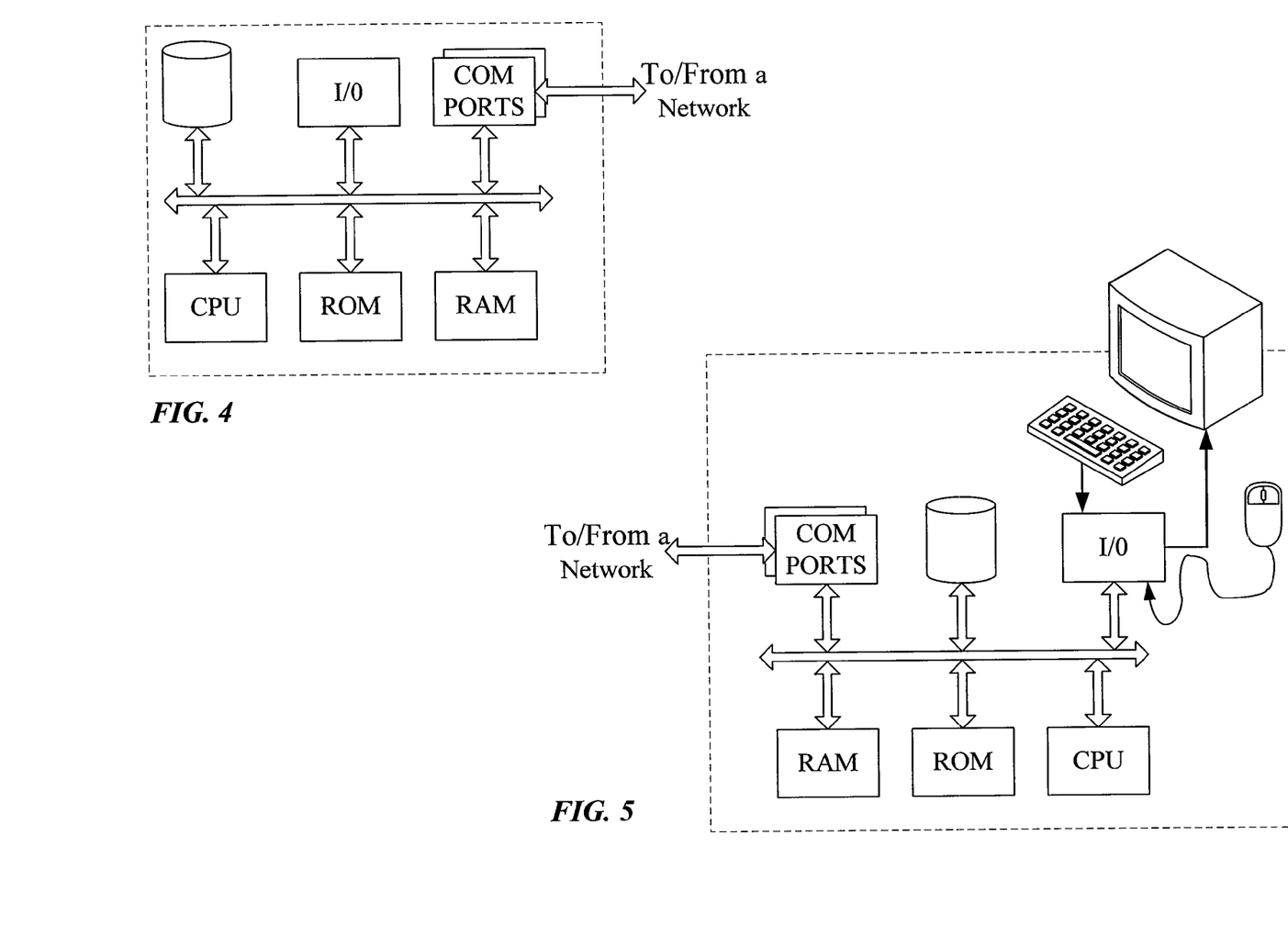
FIG. 4 is a simplified functional block diagram of a computer that may be configured as a host or server.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server or other network element (e.g., MSC 30, PDE 37, analysis server 41, . . . ). FIG. 5 depicts a computer with user interface elements, as may be used to implement a personal computer (PC) or other type of work station or terminal device, although the computer of FIG. 5 may also act as a server if appropriately programmed. For example, such general purpose platforms may store the DCA 15 and load the DCA 15 into a mobile station 13, via a network communication if the platform is a server or via a local link if the platform is a PC. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of determining the collecting network operations parameters and measurement location information via a mobile station 13 can be executed on a mobile station and on a network element such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the DCA software can be communicated to the mobile station 13. Similarly, software for the analysis server may be loaded into the hardware platform or platforms selected to perform that server function. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements. For example, although some aspects of the present disclosure describing storing the location information on the mobile station 13 along with the measurements in some instances the location information is separated from the mobile station 13. In one instance, the location information can be stored, for example, at the PDE 37. The location information can be time-stamped and tagged with a mobile station identifier (e.g., an ESN) and later correlated with the network measurements stored on the mobile station 13.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
BS: base station
BTS: base transceiver system
CDMA: code division multiple access
CD-ROM: compact disc read-only memory
DCA: data collection application
DVD: digital video disc
DVD-ROM: digital versatile (video) disc read-only memory
EPROM: erasable programmable read-only memory
EV-DO: evolution-data optimized
ESN: electronic serial number
GPS: global positioning system
GSM: global system for mobile communications
HLR: home location register
IP: Internet protocol
IR: infrared
LBS: location based services
LCD: liquid crystal display
LTE: long-term evolution
MC: message center
MIN: mobile identification number
MPC: mobile positioning center
MS: mobile station
MSC: mobile switching center
PC: personal computer
PDE: position determining entity
PN: pseudo-random noise
PROM: programmable read-only memory
PSTN: public switched telephone network
RAM: random access memory
RAN: radio access network
RF: radio frequency
SMS: short messaging service
SS7: signaling system 7
STP: signaling transfer points
TCP: transmission control protocol
TDMA: time-division multiple access
UMTS: universal mobile telecommunications system
USB: universal serial bus
VLR: visitor location register
WAN: wide are network
WIG: wireless internet gateway
XCVR: transceiver

What is claimed is:

1. A method of improving the performance of a mobile communications network, the method comprising steps of:
   operating a plurality of mobile stations over time to take a plurality of measurements of one or more operational characteristics of the mobile communications network;
   storing the measurements of one or more operational characteristics of the mobile communications network and location information related to where the measurements were taken in memories of the respective mobile stations, wherein the stored measurements include an event code, a first best per antenna (PN), a first best energy per chip (Ec) over received power (Io) per antenna (PN Ec/Io), a second best PN, and a second best PN Ec/Io, wherein a received power and the Ec/Io measures are used to calculate Ec per PN, and wherein the event code is defined as an event such as a lost call, ineffective, attempt, or periodic measurement;
   communicating, from at least some of the plurality of mobile stations, the stored measurements and location information to a network element of the wireless communications network;
   processing the measurements and location information by the network element; and
   generating by a network element, in response to the processing, a recommendation for a change to one or more network elements to improve the performance of the mobile communications network including generating a coverage map of a certain geographic region and/or for an individual mobile station of the plurality of mobile stations using the measurements based on the associated location information,
   wherein the step of processing the measurements comprises calculating the energy per chip for an antenna of the mobile communications network.

2. The method of claim 1, wherein the step of communicating the stored measurements comprises communicating the stored measurements to the network element of the wireless communication network during a specified time.

3. The method of claim 1, wherein the step of communicating the stored measurements comprises communicating the stored measurements via a short messaging service message to the network element of the wireless communications network.

4. The method of claim 1, wherein the step of communicating the stored measurements comprises communicating the stored measurements via a data message to the network element of the wireless communications network.

5. The method of claim 1, wherein the step of generating the recommendation for change comprises suggesting one or more improved parameters of a base station of the mobile communications network.

6. The method of claim 5, wherein the one or more improved parameters of the base station comprises at least one antenna parameter selected from the group consisting of: antenna height, antenna tilt, azimuth swing, and a power parameter.

7. The method of claim 1, wherein the step of taking the measurements of the one or more operational characteristics comprises measuring one or more operational characteristics of the mobile communication network selected from the group consisting of: an event code, satellite count, receive power, transmit power, channel, messaging, time, and location information.

8. The method of claim 1, wherein the step of taking the measurements of the one or more operational characteristics comprises taking the measurements in response to a wireless communications network event.

9. The method of claim 1, wherein the step of taking the measurements of the one or more operational characteristics comprises, taking the measurements at a periodic interval during the operation of the mobile station.

10. The method of claim 1, wherein the step of taking the measurements of the one or more operational characteristics comprises taking the measurements in response to receiving a request from a network element.

11. A mobile communications system, comprising:
a traffic network configured to support communications;
mobile stations in communication with the traffic network, each respective one of a plurality of the mobile stations being configured to:
take measurements of one or more operational characteristics of the mobile communications network;
store the measurements of one or more operational characteristics of the mobile communications network and location information related to where the one or more measurements were taken in a memory of the respective mobile station, wherein the stored measurements include an event code, a first best per antenna (PN), a first best energy per chip (Ec) over received power (Io) per antenna (PN Ec/Io), a second best PN, and a second best PN Ec/Io, wherein a received power and the Ec/Io measures are used to calculate Ec per PN, and wherein the event code is defined as an event such as a lost call, ineffective, attempt, or periodic measurement; and
communicate the stored measurements and location information to a network element of the wireless communications network; and
a server in communication with the traffic network, the server receiving the communicated measurements and location information from the plurality of mobile stations and processing the received measurements and location information to generate a recommendation for a change to one or more network elements to improve the performance of the mobile communications network,
wherein the server processes the measurements to calculate the energy per chip for an antenna of the mobile communications network, and
wherein the server generates the recommendation by generating a coverage map of a certain geographic region and/or for an individual mobile station of the plurality of mobile stations using the measurements based on the associated location information.

12. The system of claim 11, wherein the plurality of mobile stations are configured to communicate the stored measurements during a specified time.

13. The system of claim 11, wherein the plurality of mobile stations are configured to communicate the stored measurements via short messaging service message.

14. The system of claim 11, wherein the plurality of mobile stations are configured to communicate the stored measurements via a data service of the mobile communications network.

15. The system of claim 11, wherein the server processes the received measurements to generate a suggested change to one or more parameters of a base station of the mobile communications network.

16. The system of claim 15, wherein the one or more parameters of the base station comprise at least one antenna parameter selected from the group consisting of: antenna height, antenna tilt, azimuth swing, and a power parameter.

17. The system of claim 11, wherein the plurality of mobile stations are configured to measure one or more operational characteristics of the mobile communication network selected from the group consisting of: an event code, satellite count, receive power, transmit power, channel, and location information.

18. The system of claim 11, wherein the plurality of mobile stations are configured to measure the one or more operational characteristics in response to a wireless communications network event.

19. The system of claim 11, wherein the plurality of mobile stations are configured to measure the one or more operational characteristics at a periodic interval.

20. The system of claim 11, wherein the plurality of mobile stations are configured to measure the one or more operational characteristics in response to a request from a network element.

21. An article of manufacture comprising:
a tangible recording medium; and
executable program instructions embodied in the machine readable storage medium that when executed by a programmable system of a mobile station causes the system to perform functions comprising:
measuring one or more operational characteristics of the mobile communications network;
determining the location of where the one or more measurements were made;
storing the one or more measurements and the location of the measurements in a memory of the mobile station, wherein the stored measurements include an event code, a first best per antenna (PN), a first best energy per chip (Ec) over received power (Io) per antenna (PN Ec/Io), a second best PN, and a second best PN Ec/Io, wherein a received power and the Ec/Io measures are used to calculate Ec per PN, and wherein the event code is defined as an event such as a lost call, ineffective, attempt, or periodic measurement; and
communicating the stored measurements and location of where the measurements were made to a network element of the wireless communications network for use in generating a recommendation for a change to one or more network elements to improve the performance of the mobile communications network,
wherein the function of measuring one or more operational characteristics comprises the function of measuring the energy per chip over receive power for an antenna of the mobile communications network, and
wherein the generating the recommendation includes generating a coverage map of a certain geographic region and/or for an individual mobile station using the measurements based on the associated location information.

22. The article of manufacture of claim 21, wherein the function of measuring one or more operational characteristics comprises the function of measuring one or more of the operational characteristics of the mobile communication network selected from the group consisting of: an event code, satellite count, receive power, transmit power, channel, messaging, time, and location information.

23. The article of manufacture of claim 21, wherein the function of communicating comprises the function of communication the stored measurements and location of where the measurements were made at a specified time.

24. The article of manufacture of claim 21, wherein the function of communicating comprises the function of communication the stored measurements and location of where the measurements were made in response to a network event.

25. The article of manufacture of claim 21, wherein the function of communicating comprises the function of communication the stored measurements and location of where the measurements were made via a short messaging system message.

26. The article of manufacture of claim 21, wherein the function of communicating comprises the function of communication the stored measurements and location of where the measurements were made via a data service of the mobile communications network.

27. The article of manufacture of claim 21, wherein the function of measuring one or more operational characteristics comprises the function of measuring the one or more operational characteristics at a periodic interval during the operation of the mobile station.

28. The article of manufacture of claim 21, wherein the function of measuring one or more operational characteristics comprises the function of measuring the one or more operational characteristics in response to a request from another network element.

29. The article of manufacture of claim 21, wherein the function of measuring one or more operational characteristics comprises the function of measuring the one or more operational characteristics in response a network event.

30. An article of manufacture comprising:
a tangible recording medium; and
executable program instructions embodied in the machine readable storage medium that when executed by a programmable system of a server coupled to a mobile communications network causes the system to perform functions comprising:
processing mobile communication network measurements and associated location information captured by and communicated from a plurality of mobile stations communication through the mobile communications network, wherein the captured and communicated measurements include an event code, a first best per antenna (PN), a first best energy per chip (Ec) over received power (Io) per antenna (PN Ec/Io), a second best PN, and a second best PN Ec/Io, wherein a received power and the Ec/Io measures are used to calculate Ec per PN, and wherein the event code is defined as an event such as a lost call, ineffective, attempt, or periodic measurement; and
generating a recommendation for a change to one or more network elements to improve the performance of the mobile communications network including generating a coverage map of a certain geographic region and/or for an individual mobile station of the plurality of mobile stations using the measurements based on the associated location information,
wherein the function of processing comprises the function of calculating the energy per chip for an antenna of the mobile communications network.

31. The article of manufacture of claim 30 wherein the function of generating the recommendation for change comprises the function of suggesting one or more improved parameters of a base station of the mobile communications network.

32. The article of manufacture of claim 31 wherein the one or more improved parameters of the base station comprises at least one antenna parameter selected from the group consisting of: antenna height, antenna tilt, azimuth swing, and a power parameter.

33. A method of troubleshooting a mobile station operating on a mobile communications network, the method comprising steps of:
receiving, by a network element of the mobile communications network, a plurality of measurements of one or more operational characteristics of the mobile communications network that were captured over time by the mobile station and location information related to where the measurements were taken in by the mobile station, wherein the received measurements include an event code, a first best per antenna (PN), a first best energy per chip (Ec) over received power (Io) per antenna (PN Ea/Io), a second best PN, and a second best PN Ec/Io, wherein a received power and the Ec/Io measures are used to calculate Ec per PN, and wherein the event code is defined as an event such as a lost call, ineffective, attempt, or periodic measurement;
processing the measurements and location information by the network element;
identifying, in response to the processing, a problem related to the operation of the mobile station; and
generating by a network element, in response to the processing, a recommendation for a change to a setting of at least one of the mobile station or a network element of the mobile communications network,
wherein the step of processing the measurements comprises calculating the energy per chip for an antenna of the mobile communications network, and
wherein the step of generating the recommendation includes generating a coverage map of a certain geographic region and/or for the mobile station using the measurements based on the associated location information.

34. The method of claim 33, wherein identifying a problem related to the operation of the mobile station comprises identifying a problem with an operational characteristic of the mobile communications network.

35. The method of claim 33, wherein identifying a problem related to the operation of the mobile station comprises identifying a problem with an operational characteristic of the mobile station.

* * * * *